US006829621B2

(12) United States Patent
Keller

(10) Patent No.: US 6,829,621 B2
(45) Date of Patent: Dec. 7, 2004

(54) AUTOMATIC DETERMINATION OF OLAP CUBE DIMENSIONS

(75) Inventor: Martin Keller, Vaihingen (DE)

(73) Assignee: International Business Machines Corporation, Armonk, NY (US)

(*) Notice: Subject to any disclaimer, the term of this patent is extended or adjusted under 35 U.S.C. 154(b) by 637 days.

(21) Appl. No.: 09/971,129

(22) Filed: Oct. 3, 2001

(65) Prior Publication Data

US 2002/0091707 A1 Jul. 11, 2002

(30) Foreign Application Priority Data

Oct. 6, 2000 (EP) ............................................ 00121837

(51) Int. Cl.$^7$ .............................................. G06F 17/30
(52) U.S. Cl. ...................... 707/104.1; 707/707; 707/1; 707/2; 707/5; 707/101
(58) Field of Search ............................. 707/104.1, 10, 707/6, 4, 5, 2, 1

(56) References Cited

U.S. PATENT DOCUMENTS

| | | | | |
|---|---|---|---|---|
| 6,768,986 B2 | * | 7/2004 | Cras et al. ...................... | 707/2 |
| 2002/0087516 A1 | * | 7/2002 | Cras et al. ...................... | 707/2 |
| 2002/0091707 A1 | * | 7/2002 | Keller ...................... | 707/104.1 |
| 2004/0122844 A1 | * | 6/2004 | Malloy et al. ............... | 707/102 |

OTHER PUBLICATIONS

Niemi et al., "Construction OLAP Cubes based on queries", ACM, pp. 9–15.*
Shanmugasundaram et al., "Compressed data cubes for OLAP aggregate query approximation on continuous dimensions", ACM, pp. 223–232.*
Jiawei Ham "Towards On–line Analyta–ical Mining in large databases", ACM, pp. 1–11.*
Paiceir et al., "Discovery of multi–level rules and exceptions from a distributed database", ACM, pp. 523–532.*

* cited by examiner

Primary Examiner—Jean M. Corrielus
(74) Attorney, Agent, or Firm—David R. Irvin

(57) ABSTRACT

Means and a computerized method for determining variable dimensions for a multi-dimensional database table, whereby the database table also comprises at least one pre-defined measure dimension for storing values of one or more measure types. Input records are treated as an implicit, yet unknown functional relationship between the measure types as dependent variables and the variable types as independent variables. A regression function is then calculated and used as a prediction model for the measure types based on the variable types, using the input records. The most significant variable types contributing to this prediction model are selected as variable dimensions for the database table.

14 Claims, 7 Drawing Sheets

AUTOMATIC DETERMINATION OF OLAP CUBE DIMENSIONS

FIELD OF THE INVENTION

This invention relates in general to database management systems performed by computers, and in particular, to database management systems that support on-line analytical processing (OLAP).

BACKGROUND

Relational DataBase Management System (RDBMS) software using a Structured Query Language (SQL) interface is well known in the art. The SQL interface has evolved into a standard language for RDBMS software and has been adopted as such by both the American National Standards Institute (ANSI) and the International Standards Organization (ISO).

RDBMS software has typically been used with databases having traditional data types that are easily structured into tables. However, RDBMS products do have limitations with respect to providing users with specific views of data. Thus, "front-ends" have been developed for RDBMS products so that data retrieved from the RDBMS can be aggregated, summarized, consolidated, summed, viewed, and analyzed. However, even these "front-ends" do not easily provide the ability to consolidate, view, and analyze data in the manner of "multi-dimensional data analysis." This type of functionality is also known as on-line analytical processing (OLAP).

A thorough state of the art description of OLAP technology is provided by Erick Thompson, "OLAP Solutions—Building Multidimensional Information Systems", Wiley Computer Publishing, 1997.

OLAP generally provides numerous, speculative "what-if" and/or "why" data model scenarios executed by a computer. Within these scenarios, the values of key variables or parameters are changed, often repeatedly, to reflect potential variances in measured data. Additional data is then synthesized through animation of the data model. This often includes the consolidation of projected and actual data according to more than one consolidation path or dimension.

Data consolidation or aggregation is the process of synthesizing data into essential knowledge. The highest level in a data consolidation path is referred to as that data's dimension. A given data dimension represents a specific perspective of the data included in its associated consolidation path. There are typically a number of different dimensions from which a given pool of data can be analyzed. This plural perspective, or Multi-Dimensional Conceptual View, appears to be the way most business persons naturally view their enterprise. Each of these perspectives is considered to be a complementary data dimension. Simultaneous analysis of multiple data dimensions is referred to as multi-dimensional data analysis.

OLAP functionality is characterized by dynamic multi-dimensional analysis of consolidated data supporting end user analytical and navigational activities including:

calculations and modeling applied across dimensions, through hierarchies and/or across members;

trend analysis over sequential time periods;

slicing subsets for on-screen viewing;

drill-down to deeper levels of consolidation;

reach-through to underlying detail data; and rotation to new dimensional comparisons in the viewing area.

A key feature of any multidimensional OLAP system is the ability to define a dataset in terms of multiple dimensions. Loosely speaking, dimensions may be thought of as major perspectives, entities, factors, or components. So a multidimensional dataset may be thought of as multi-key or multi-attribute data set. The benefit of handling multiple dimensions is in being able to represent the full richness of a dataset in a single model or cube.

A further key feature of any multidimensional OLAP system is the hierarchical nature of the dimensions. Any dimension such as "time", "products", and "stores" can have multiple levels of granularity. For example, the "time" dimension may have a day-level granularity, a week-level granularity, a month-level granularity, a quarter-level granularity, and so on. This is indispensable for working with larger data sets that invariably need to be aggregated, analyzed, and viewed across multiple levels of aggregation.

A further key feature of any dimensional OLAP system is the ability to attach formulas to members of dimensions. Because a single member of one dimension, say the "Sales" member from a variables dimension, interacts with every single member from every other dimension, a single-dimensional formula has a powerful application range frequently doing the same work that would otherwise take thousands of spreadsheet formulas. Also more multi-dimensional formulas work equally well in all dimensions. Multi dimensional formulas dramatically simplify the process of defining aggregation and analysis calculations.

The dimensions are used to build up the hierarchy information which is the basis for the later analysis of the data. With the hierarchy information the user has the capability to see aggregated business information on higher levels. It is also possible to drill down from some higher level information to the lower level once to examine individual aspects of differences within the data.

Typically the multi-dimensional data is organized and represented in a form of a (hyper-)cube, wherein the various dimensions of the data are reflected as cube dimensions.

As the available amount of raw data and the number of available variable types, which potentially could be used as dimensions for multidimensional database tables, is so large, one of the most fundamental problems within OLAP technology is to select the "correct" variable types to be used as OLAP cube dimensions. As a rule of thumb, a multi-dimensional database table should not exceed about eight dimensions. Choosing an inappropriate dimension therefore reduces the freedom of selecting other variable types as dimensions of a multidimensional database table. During the setup phase, the structure of the multidimensional database tables are defined implementing the internal representations of the OLAP cube. Identifying the "correct" variable types to be used as dimensions of the multidimensional database tables has a dramatic influence on the success of OLAP technology.

First of all, a selection of certain variable types provides a significant reduction of the large amount of business data which is to be analyzed and used to populate the multidimensional database tables.

Second, the nature and the number of the selected variable types define the size of OLAP cubes in terms of the amount of required storage.

The following example suggests the large amount of storage required to build the OLAP multidimensional data structures to store the input data and the derived, computed data. The size of the multidimensional database table is a function of the number of dimensions (defined by the variable types) and the number of elements in each dimension. The maximum possible size of such a multidimensional database table is obtained by multiplying together the number of elements in each dimension. For example, when Dimension 1 has a 50 members Dimension 2 has 100 members, Dimension 3 has 12 members, Dimension 4 has 1000 members, and Dimension 5 has 12000 members, The total number of potential members is 50*100*12*1000*12000 or 720,000,000,000. If just one more dimension, that is a further variable type, with only 10 members were added to this multidimensional database table, the above maximum potential size of the multidimensional database table would be multiplied by a factor of 10. This phenomenon is known as database explosion.

As a result, OLAP databases are very large and require significant resources to load and to calculate. To avoid this OLAP database explosion, designers must constrain the number of dimensions in each multidimensional database table. The mean storage requirements to store an OLAP cube with about 8 dimensions is in the range of 5 to 15 gigabytes of data. Thus, any "wrong" dimension introduced to the multidimensional database table could result in an intractable model. Vice versa, "wrong" dimensions and too many dimensions increase processing time significantly, which is a major drawback within OLAP technology wherein many analysis steps are performed interactively with a user. Moreover, the quality of the analysis provided by OLAP technology is significantly improved if the "Correct" variable types are selected; avoiding variable types within the multidimensional database tables with minor importance to the measure data also leads to improved analysis quality.

Consequently, an object of the invention is to provide a technology for automatically determining the variable dimensions of multi-dimensional database tables forming a representation of OLAP cubes, and providing a starting point for OLAP processing.

SUMMARY

The present invention relates to means and a computerized method for automatically determining one or more variable dimensions for a multi-dimensional database table, whereby the multi-dimensional database table also comprises at least one pre-defined measure dimension for storing values of one or more measure types.

For the purpose of determining variable dimensions, a multitude of input records are treated as implicit, yet unknown functional relationships between the measure types (as dependent variables) and the variable types (as independent variables). A regression function is calculated and used as a prediction model for the (dependent) measure types based on the (independent) variable types utilizing the multitude of input records. The most significant variable types contributing to this prediction model are then selected as variable dimensions for the multidimensional database table, i.e. as the OLAP cube dimensions.

The present invention solves a fundamental problem within OLAP technology, namely the problem of selecting the "correct" variable types to be used as variable dimensions of a multidimensional database table also defining the so-called OLAP cube dimensions. At present, human experts are required to perform this selection process based on extensive experience and an intuitive feel for the data to be treated by OLAP technology. The current invention proposes an automatic and computerized method for solving this problem.

Selection of the "correct" variable types provides a significant reduction of the large amount of business data which is to be analyzed and used to populate the multidimensional database tables. Selection of "wrong" variable dimensions is avoided. Both aspects ensure that the extremely complex multidimensional database tables remain tractable in terms of required storage and processing time. Moreover, the quality of the OLAP analysis is significantly improved by selecting "correct" variable types; conversely, avoiding variable types within the multidimensional database tables with minor importance to the measure data is also an important aspect of improved analysis quality.

DETAILED DESCRIPTION

Figure 1:
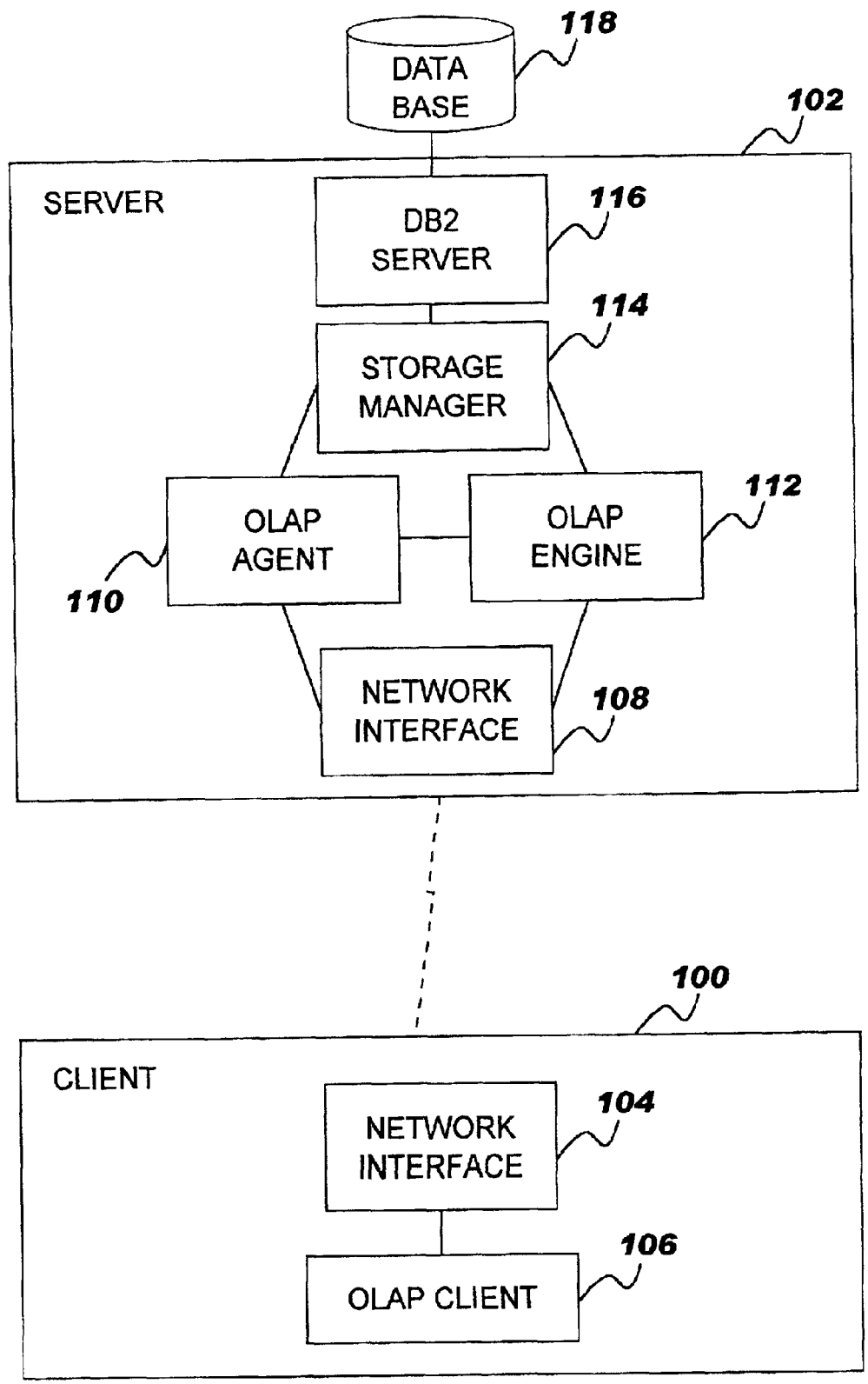
FIG. 1 is a block diagram illustrating a hardware environment used to implement an exemplary embodiment of the present invention.

The present invention may be realized in hardware, software, or a combination of hardware and software. Any kind of computer system—or other apparatus adapted for carrying out the methods described herein—is suited. A typical combination of hardware and software may be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

"Computer program means" or "computer program" in the present context mean any expression, in any language, code, or notation, of a set of instructions intended to cause a system having an information processing capability to perform a particular function either directly or after either one or both of the following a) conversion to another language, code, or notation; b) reproduction in a different material form.

Also, when the term database is used within the present specification, this is not to be understood as a limitation for instance to relational database management systems, hierarchical database management systems, and the like. A database according to the present invention can also be a flat file, for example, or any other collection of corresponding data. Moreover, the notion of a database table not only refers to a collection of data within a persistent storage medium, it also includes data within volatile memory (for example, being the result of a pre-processing step wherein a plurality of data sources are combined into the database table). Furthermore, the notion of a table is to be understood from a conceptual perspective only.

Overview of OLAP Technology

The present invention comprises an OLAP system that is designed for a wide-range of multi-dimensional reporting and analysis applications. The OLAP system is based both on Hyperion Software's Essbase OLAP software and IBM's DB2 RDBMS software. The present invention utilizes a number of components from Hyperion Software's Essbase OLAP system, including components that provide data access, navigation, application design and management, and data calculation. However, the present invention comprises new elements that automatically determine the most important variable dimensions to be reflected within a multidimensional database table and the OLAP cubes.

The relational database utilized by the present invention provides the capacity of industry leading relational databases, and can be managed by familiar RDBMS systems management, backup, and recovery tools. It also offers the advantage of providing access to data using standard SQL (Structured Query Language). In addition, the present invention is designed for applications with very large data volumes. Further, the present invention leverages the existing RDBMS skills of information technology professionals.

The present invention differs from prior art ROLAP (Relational-OLAP) products in significant ways. Prior art ROLAP products, for example, are unsuited for applications which require complex calculations, read/write support, or high numbers of concurrent users. In addition, prior art ROLAP products require extensive support staffs or consultants to develop and deploy applications.

The present invention does not share any of these limitations. Because it integrates Hyperion Software's Essbase OLAP software with IBM's DB2 RDBMS software, the present invention provides simplified application design, robust calculation capabilities, and flexible data access coupled with scalability of user access. Significant advantages of the present invention over ROLAP include: performance; automatic table, index and summary management; robust analytical calculations; multi-user read and write access; and security.

With regard to performance, the present invention is designed to deliver consistent, fast response measured in seconds regardless of database size. Prior art ROLAP products measure response time in tens of seconds, minutes or hours.

With regard to automatic table, index, and summary management, the present invention automatically creates and manages tables and indices within a star schema in the relational database. The present invention can also populate the star schema with calculated data. Prior art ROLAP products require teams of database architects to manage hundreds or thousands of summary tables manually in order to deliver acceptable end-user performance.

With regard to robust analytical calculations, the present invention is designed to perform high-speed data aggregations (revenue by week, month, quarter and year), matrix calculations (percentages of totals), cross-dimensional calculations (market share and product share) and procedural calculations (allocations, forecasting). Prior art ROLAP products provide less robust calculation capabilities.

With regard to multi-user read and write access, the present invention is designed to support multi-user read and write access which enables operational OLAP applications such as budgeting, planning, forecasting, modeling, "what-if'ing" etc. In contrast, prior art ROLAP products are read-only.

With regard to security, the present invention is designed to deliver robust data security down to the individual data cell level. Prior art ROLAP products provide no security, or only limited application level security.

The capabilities of the present invention are the same as those of Hyperion Software's Essbase OLAP software, including sophisticated OLAP calculations, comprehensive OLAP navigation features, complex database access support and multi-user read/write functionality. In addition, front-end tools, system management tools, and applications from Hyperion Software and leading third parties will also work with the present invention. Consulting and education companies that have developed expertise with Hyperion Software's Essbase OLAP software can immediately apply their experience and knowledge to the present invention.

Although the present specification describes the use of IBM's DB2 RDBMS software, those skilled in the art will recognize that the present invention can use DB2, Oracle, Informix, Sybase, or other RDBMS software, and can run on computers using IBM OS/2, Microsoft Windows NT, IBM-AIX, Hewlett-Packard HP-UX, Sun Solaris, and other operating systems.

Hardware Environment

FIG. 1 is a block diagram illustrating a hardware environment used to implement a preferred embodiment of the present invention. In the hardware environment, a client/server architecture is illustrated comprising an OLAP client computer 100 coupled to an OLAP server computer 102. In the hardware environment, the OLAP client 100 and OLAP server 102 may each include, inter alia, a processor, memory, keyboard, or display, and may be connected locally or remotely to fixed and/or removable data storage devices and/or data communications devices. Each of the computers 100 and 102 also could be connected to other computer systems via the data communications devices. Those skilled in the art will recognize that any combination of the above components, or any number of different components, peripherals, and other devices, may be used with the computers 100 and 102. Those skilled in the art will also recognize that the present invention may be implemented on a single computer, rather than multiple computers networked together.

The present invention is typically implemented using one or more computer programs, each of which executes under the control of an operating system, such as OS/2, Windows, DOS, AIX, UNIX, MVS, etc., and causes the computers 100 and 102 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system comprise instructions which, when read and executed by the computers 100 and 102, cause the computers 100 and 102 to perform the steps necessary to implement and/or use the present invention. Under control of the operating system, the computer programs may be loaded from the memory, data storage devices, and/or data communications devices into the memories of the computers 100 and 102 for use during actual operations. Those skilled in the art will recognize many modifications may be made to this configuration without departing from the scope of the present invention.

In the example illustrated in FIG. 1, the present invention includes a network interface program 104 and an OLAP client program 106 executed by the OLAP client 100, and a network interface program 108, an OLAP agent program 110, an OLAP engine program 112, a relational storage manager (RSM) program 114, and a DB2 server program 116 executed by the OLAP server 102. The DB2 server program 116, in turn, performs various database operations, including search and retrieval operations, termed queries, insert operations, update operations, and delete operations, against one or more relational databases 118 stored on a remote or local data storage device.

The present invention utilizes a number of components from Hyperion Software's Essbase OLAP system, including the network interface 104, OLAP client 106, network interface 108, OLAP agent 110, and OLAP engine 112. These components provide data access, navigation, application design and management, and data calculation. However, the relational storage manager 114 and DB2 server 116 comprise new elements that access (e.g., store and retrieve) data for the OLAP system in a relational database.

Those skilled in the art will recognize that the hardware environment illustrated in FIG. 1 is not intended to limit the present invention. Indeed, those skilled in the art will recognize that other alternative hardware environments may be used without departing from the scope of the present invention.

Conceptual Structure of the Multi-Dimensional Database

Figure 2:
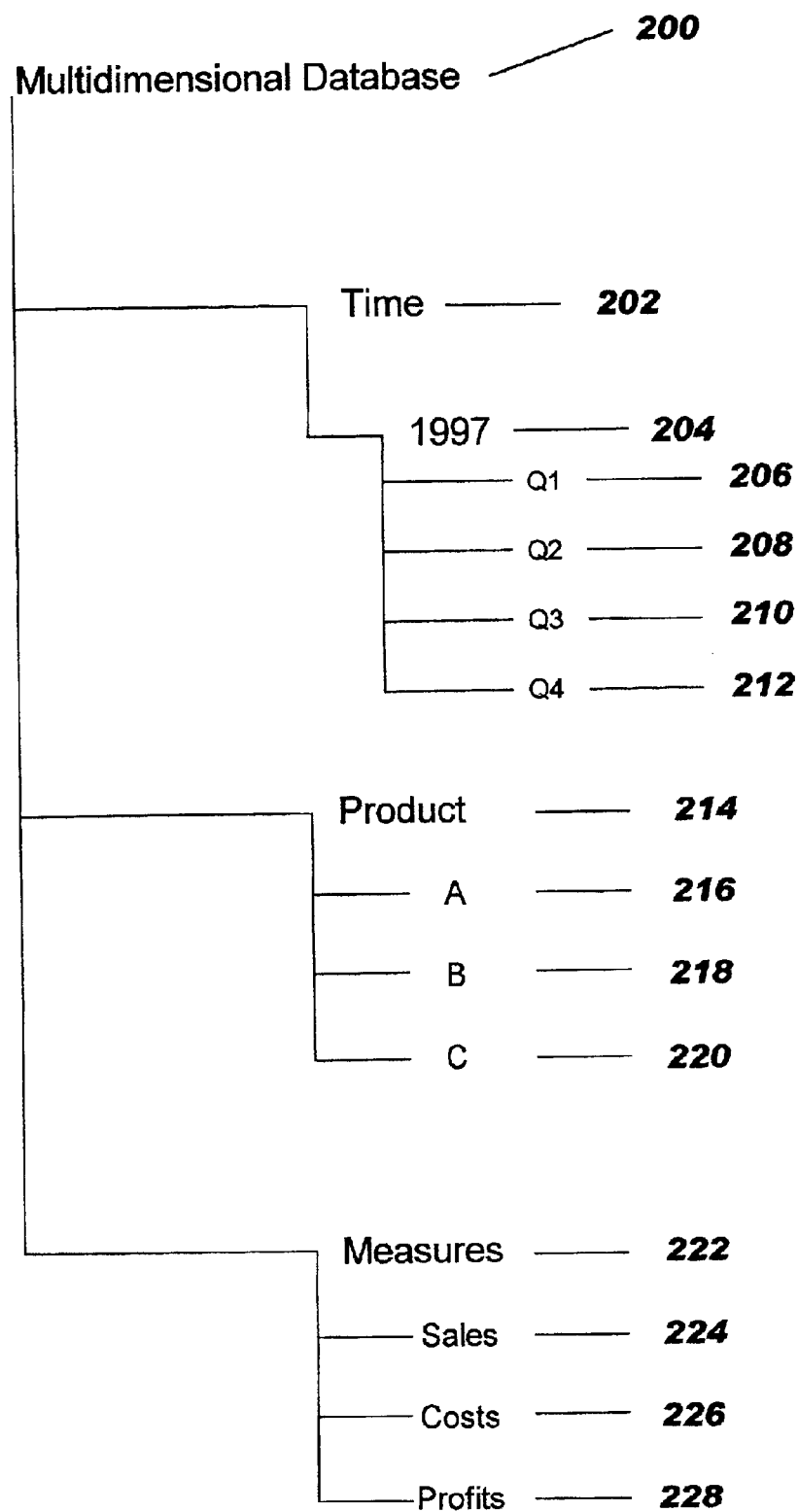
FIG. 2 is a diagram that illustrates the conceptual structure of a multi-dimensional database according to the present invention.

FIG. 2 is a diagram that illustrates the conceptual structure (i.e., an outline) of a multi-dimensional database 200 according to the present invention. A dimension 202, 214, or 222 is a structural attribute that is a list of members, all of which are of a similar type in the user's perception of the data. For example, the year 1997 204 and all quarters, Q1 206, Q2 208, Q3 210, and Q4 212, are members of the Time dimension 202. Moreover, each dimension 202, 214, or 222 is itself considered a member of the multi-dimensional database 200.

Logical Structure of the Multi-Dimensional Database

Figure 3:
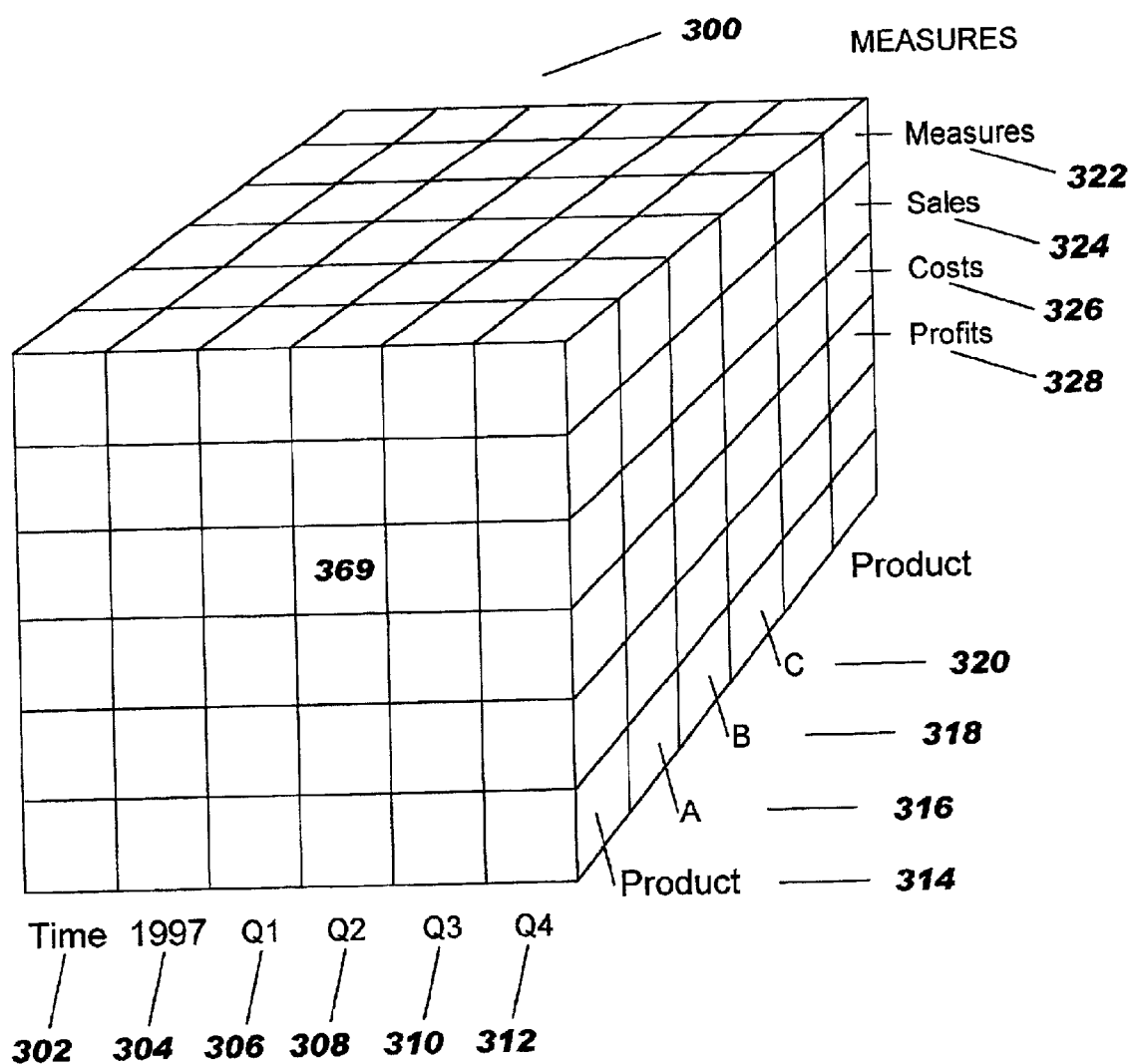
FIG. 3 is a diagram that illustrates the logical structure of a multi-dimensional database according to the present invention.

FIG. 3 is a diagram that illustrates the logical structure of a multi-dimensional database 300 according to the present invention. Generally, the multi-dimensional database 300 is arranged as a multi-dimensional array, so that every data item is located and accessed based on the intersection of the members which define that item. The array comprises a group of data cells arranged by the dimensions of the data. For example, a spreadsheet exemplifies a two-dimensional array with the data cells arranged in rows and columns, each being a dimension. A three-dimensional array can be visualized as a cube with each dimension forming an edge. Higher dimensional arrays (also known as Cubes or Hypercubes) have no physical metaphor, but they organize the data in a way desired by the users.

A dimension serves as an index for identifying values within the Cube. If one member of the dimension is selected, then the remaining dimensions in which a range of members (or all members) are selected defines a sub-cube in which the number of dimensions is reduced by one. If all but two dimensions have a single member selected, the remaining two dimensions define a spreadsheet (or a "slice" or a "page"). If all dimensions have a single member selected, then a single cell is defined. Dimensions offer a very concise, intuitive way of organizing and selecting data for retrieval, exploration and analysis.

A single data point or cell occurs at the intersection defined by selecting one member from each dimension in a cube. In the exemplary cube shown in FIG. 3, the dimensions are Time, Product, and Measures. The cube is three dimensional, with each dimension (i.e., Time, Product, and Measures) represented by an axis of the cube. The intersection of the dimension members (i.e., Time 302, 1997 304, Q1 306, Q2 308, Q3 310, Q4 312, Product 314, A 316, B 318, C 320, Measures 322, Sales 324, Costs 326, and Profits 328) are represented by cells in the multi-dimensional database that specify a precise intersection along all dimensions that uniquely identifies a single data point. For example, the intersection of Q2 308, Product 314 and Costs 326 contains the value, 369, representing the costs of all products in the second quarter of 1997.

Cubes generally have hierarchies or formula-based relationships of data within each dimension. Consolidation involves computing all of these data relationships for one or more dimensions. An example of consolidation is adding up all sales in the first quarter. While such relationships are normally summations, any type of computational relationship or formula might be defined.

Members of a dimension are included in a calculation to produce a consolidated total for a parent member. Children may themselves be consolidated levels, which requires that they have children. A member may be a child for more than one parent, and a child's multiple parents may not necessarily be at the same hierarchical level, thereby allowing complex, multiple hierarchical aggregations within any dimension.

Drilling down or up is a specific analytical technique whereby the user navigates among levels of data ranging from the most summarized (up) to the most detailed (down). The drilling paths may be defined by the hierarchies within dimensions or other relationships that may be dynamic within or between dimensions. For example, when viewing data for Sales 324 for the year 1997 304 in FIG. 3, a drill-down operation in the Time dimension 302 would then display members Q1 306, Q2 308, Q3 310, and Q4 312.

Relational Database Structure

Figure 4:
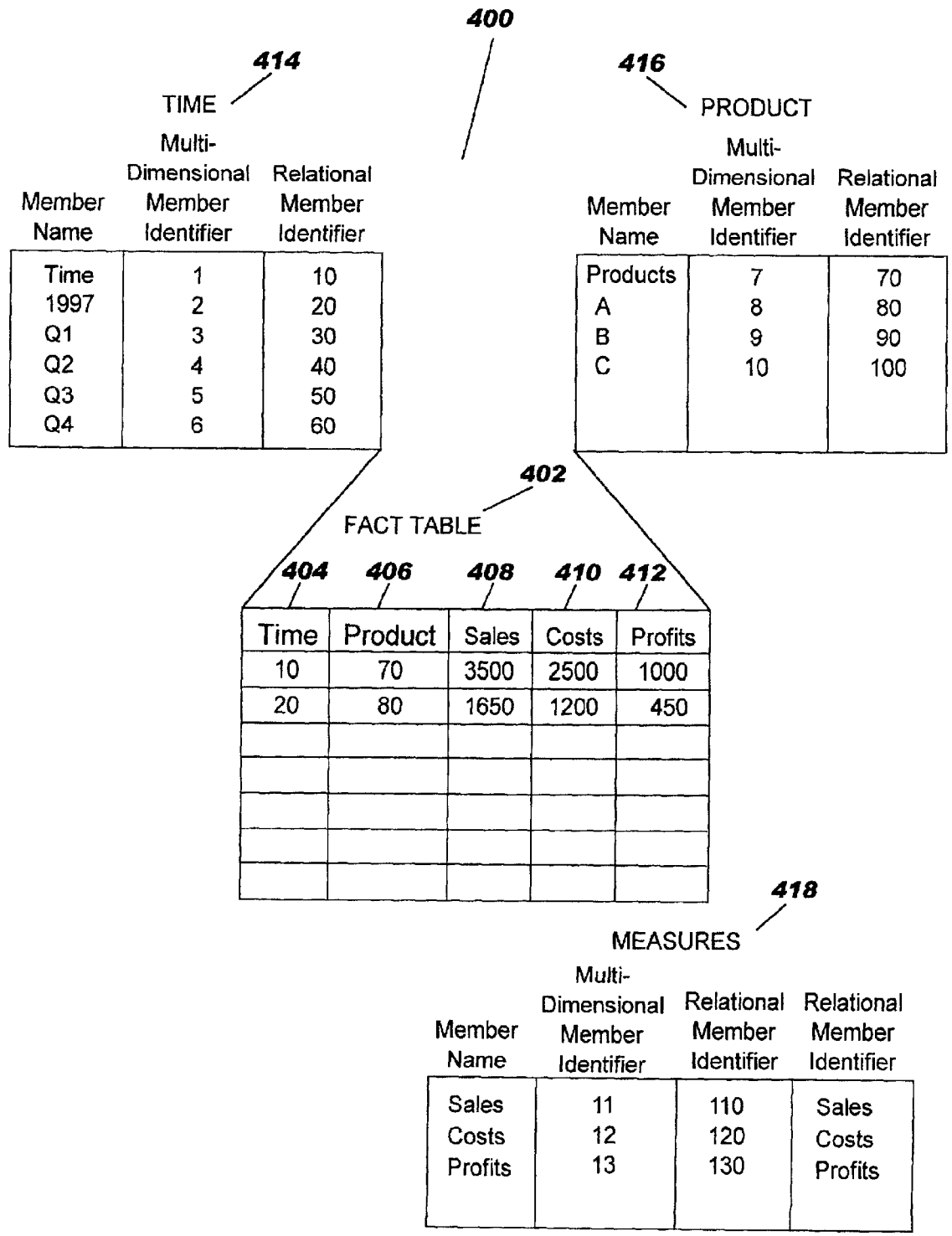
FIG. 4 is a diagram that illustrates a structure for storing multi-dimensional data in a relational database structure according to the present invention.

FIG. 4 is a diagram that illustrates a structure for storing multi-dimensional data in a relational database structure according to the present invention. The present invention stores data in a star schema 400 in the relational database 118. A star schema 400 is a set of relational tables including one or multiple main tables 402 and related dimension tables 414, 416, and 418, wherein the dimension tables 414 and 416 intersect the main table 402 via common columns, and wherein the dimension table 418 has a column in the main table 402 corresponding to each of its rows. A star schema 400 has several benefits over storing information in traditional RDBMS tables used for on-line transaction processing (OLTP).

Because a star schema 400 is simple, having few tables, it minimizes the complexity required to process database operations. This helps both to speed performance and to ensure correct results of database operations.

Moreover, the use of a star schema 400 is a well known, standard model, and many relational databases 118 have built in optimization for it. By adhering to this standard model, the present invention automatically takes advantage of any such optimization.

In the example of FIG. 4, the boxes represent the fact table 402 and dimension tables 414, 416, and 418. The connections between the boxes 402, 414 and 416 represent star joins between tables. The star schema 400 thus comprises fact tables 402, which is joined to one or more dimension tables, TIME 414 and PRODUCT 416, according to specified relational or conditional operations. The fact table 402 holds data values, while the dimension tables TIME 414, PRODUCT 416, and MEASURES 418 hold member information. As a result, the dimension tables 414, 416, and 418 are relatively small, and the fact table 402 is usually very large.

The dimension tables TIME 414 and PRODUCT 416 are usually joined to the fact table 402 with an equivalence condition. In this example of a star schema 400, there are no join conditions between the dimension tables TIME 414, PRODUCT 416, and MEASURES 418 themselves.

In a preferred embodiment, one dimension, called an "Anchor" dimension, is treated differently from the other dimensions, called "non-anchor" dimensions, in that all of its members are mapped to columns in the fact table 402. For example, in FIG. 4, the MEASURES dimension 418 is the anchor dimension. There is one column in the fact table (i.e., SALES 408, COSTS 410, and PROFITS 412) for each member, Sales, Costs, and Profits, of the MEASURES dimension 418. The fact table 402 also contains one column, TIME 404 and PRODUCT 406, for each other non-anchor dimension, TIME 414 and PRODUCT 416.

Fact Table

In a preferred embodiment of the present invention, there is one fact table 402 for each Cube. Its purpose is to hold the actual data values of the Cube. In other embodiments, however, more than the one fact table 402 per cube maybe supported to deal with large numbers of members.

The fact table 402 has a dimension column corresponding to each non-anchor dimension table 414 and 416. The dimension columns of the fact table 402 hold relational member identifiers, and the non-anchor dimension tables 414 and 416 hold the mapping between those relational member identifiers and the member names and multi-dimensional member identifiers. The data values in the fact table 402 are indexed by the relational member identifiers from each of the dimension columns.

One row in the fact table 402 contains all data values for a unique combination of members from the different non-anchor dimension tables 414 and 416. Specifically, the dimension columns 404 and 406 contain relational member identifiers corresponding to the multi-dimensional member identifiers, and the member columns 408, 410, and 412 contain data values. For example, the first row in the example of FIG. 4, holds the Sales of 3500, Costs of 2500, and Profits of 1000 for every Product and all Times. Moreover, the second row, in the example of FIG. 4, holds the Sales of 1650, Costs of 1200, and Profits of 450 for Product A during the 1997 Time frame.

The fact table 402 only holds rows for valid combinations of members from the non-anchor dimensions. So, for example, if a particular product is not sold in a year, there will be no sales, costs or profit figures for any time period for that product in that year. Consequently, the fact tables 402 through 422 would not hold any rows for these combinations.

Dimension Tables

As described above, there is a dimension table for each dimension defined in the Cube (i.e., based on the outline). The purpose of the dimension tables is to hold all information relevant to the members of a particular dimension.

Each dimension table contains one row for each member defined in the associated dimension. Note that the dimension name itself is considered to be a member since it represents the top level of the hierarchy for that dimension. The columns are as follows:

MemberName This is the member name. It is the user-entered name for each member. The value of the MemberName is set to a NULL value if this member is deleted. When a RelMemberId is required, the RelMemberId corresponding to a MemberName which is a NULL value is reused.

RelMemberName This is the relational member name. It is only used in the Anchor dimension table (because the members from this dimension map to columns in the fact table 402). This column therefore needs to contain valid relational column names. Therefore, this column may contain member names which have been modified from those stored in MemberName, if necessary.

RelMemberId This is the relational member identifier. This contains an identifying number for each member used to access data in the relational database. This number is unique within the dimension table. This column is used to 'join' the dimension table to the fact table. Members always retain the same relational member identifier throughout their life time. A relational member identifier may be reused if a member is deleted and another member is created.

MemberId This is the multi-dimensional member identifier. This contains an identifying number allocated to the member by Essbase. When a Cube definition is altered in Essbase and the Essbase database is restructured, this value may be changed by Essbase. This is a NULL value if MemberName is a NULL value.

The MemberName is typically obtained from the outline. The MemberId is assigned by Hyperion Software's Essbase OLAP software and is used by this software to access multi-dimensional data stored in dense data blocks in a multi-dimensional database 300. The RelMemberId is the common column between the non-anchor dimension tables 414 and 416 and the fact table 402 that is used to join the tables 402, 414, and 416 and is used to access data in the relational database 118 (i.e., fact table 402). The MemberId, which is used internally by Hyperion Software's Essbase OLAP software, maps to the RelMemberId, which is used by the relational database 118 to access data.

Accessing Multi-Dimensional Data

To access the multi-dimensional data in the relational database 118, a user interacts with the OLAP client program 106 executed by the OLAP client 100. This interaction results in a request (i.e., command) for a database operation being formed, which is transmitted to the OLAP agent 110 and/or OLAP engine 112 executed by the OLAP server 102 via the network interface programs 104 and 108. The OLAP agent 110 communicates with the OLAP engine 112, and the OLAP engine 112 executes functions via the relational storage manager 114 to access the multi-dimensional data from a data storage manager. In Hyperion Software's Essbase OLAP software, data is requested by specifying one or more sparse index keys (i.e., a sparse index key is an encoding of one member from each sparse dimension) that identify one or more dense data blocks in the multi-dimensional database 300.

In the present invention, these sparse index keys comprise combinations of one MemberId for each sparse dimension used internally in Hyperion Software's Essbase OLAP software. The relational storage manager 114 requests the OLAP Engine 112 to decompose the sparse index key into a list of MemberIds. The relational storage manager 114 maps the MemberIds to the RelMemberIds used in the relational database 118 via the respective non-anchor dimension tables 414 and 416 in the relational database 118. Then, the RelMemberIds are used to access the respective non-anchor dimension tables 414 and 416 in the relational database 118. The resulting rows of the non-anchor dimension tables 414 and 416 are joined to corresponding rows in the fact table 402. The joined rows of the fact table 402, which thus meet the criteria of the sparse index keys, are returned by the DB2 server 116 to the relational storage manager 114. The rows returned have RelMemberIds followed by values for each of the members of the anchor dimension (e.g., the MEASURES dimension 418 in FIG. 4). The relational storage manager 114 then converts the RelMemberIds into MemberIds and reformats the rows from the fact table 402 into a "dense data block". The reformatted rows are passed to the OLAP engine 112, which ultimately return the desired data to the OLAP client 106.

In this manner, the relational database 118 can be used to emulate multi-dimensional data in a multi-dimensional database 300. Moreover, by converting between MemberIds of the sparse index keys and RelMemberIds, the DB2 server 116 is able to treat the data in the relational database 118 as dense data blocks for Hyperion Software's Essbase OLAP software, while actually maintaining the data in a relational database 118.

In an alternative embodiment, the MemberIds and the RelMemberIds are mapped to each other using two in-memory arrays. The array used to map MemberIds to RelMemberIds has an element for each MemberId containing the corresponding RelMemberId. The array used to map RelMemberIds to MemberIds has an element for each RelMemberId containing the corresponding MemberId. These arrays are generated after the outline is created, and they are re-constructed each time the relational storage manager 114 initializes or "opens" the multi-dimensional database and after each outline re-structure.

In Hyperion Software's Essbase model of a multi-dimensional database, the dense data blocks of the multi-dimensional database are ordered by the numerical values of their sparse index keys. In the present invention, the relational storage manager 114 maintains the ordering of the dense data blocks by storing the sparse index keys in a key table. The relational storage manager 114 holds also holds additional information about each dense data block in the key table. In particular, the information includes status information (e.g., usage information) and timestamps (e.g., age information).

A New Interpretation of the Measure Dimensions of Multidimensional Database Tables The typical starting point of OLAP technology is a very large number of input records. These input records form the source from which OLAP technology extracts and aggregates data to be used to populate a multidimensional database table. The input records may originate from a multitude of different files, data bases, and the like. From a conceptual perspective the input records are interpreted as comprising values of a multitude of different variable types and values of a multitude of different measure types. Usually the identity of the measure types is evident; they can be identified as the typical business targets of the business to be analyzed. These units-bearing data types are either measured or derived. "Sales", "Costs", "Profit", and "Interest rates" are typical examples of measure types. These measure types typically are treated and kept separate from the variable dimensions according to which they are organized. OLAP products combine these measure types either in a single or multiple measure dimensions of the multidimensional database table.

Therefore, while the identity of the measure dimension is evident from the multitude of input records, the identity of the variable types to be used as variable dimensions according to which the measure dimensions is organized is far from being obvious, for two reasons: on one hand, because of the very large number of candidate variable types which could be used as variable dimensions, and on the other hand, because only very few variable dimensions (currently in the range of 8 dimensions) can effectively be processed by current state of the art OLAP technology. According to the current state of the art it is completely left up to human insight and human "feeling" to select the hopefully "correct" variable types as variable dimensions for the multidimensional database table.

Thus, the very point of the current invention is to provide a computerized and automatic method for determining the variable dimensions of a multidimensional database table according to which the measure dimension(s) is(are) organized. In other words, the invention provides a teaching for determining the M most significant variable dimensions for a set of L given measure types selected from a multitude of N potential variable types, where M is significantly smaller than N.

A chain of observations to develop a solution could start with the basic idea of automatically determining the most "Relevant" variable types. From this point, one could argue that the most relevant variable types are those with the "most significant influence" on the values of the measure types. This approach introduces a most important and implicit new concept: a functional relationship between the measure types and the variable types is assumed. The present invention, therefore provides for treating, for the purpose of determining the variable dimensions, the multitude of input records as an implicit, yet unknown functional relationship between the measure types (as a dependent variables) and the variable types (as independent variables) and calculating a prediction model for the (dependent) measure types based on the (independent) variable types utilizing the multitude of input records. The most significant variable types contributing to this prediction model are then selected as variable dimensions for the multidimensional database table. The current invention includes the use of regression function technology for the calculation of a prediction model.

Using statistical terminology, the basic idea of the current invention can be formulated as follows: a high correlation between the variances of the values of the measure types and the variances of the values of the variable types identifies those variable types to be used as variable dimensions.

Figure 5:
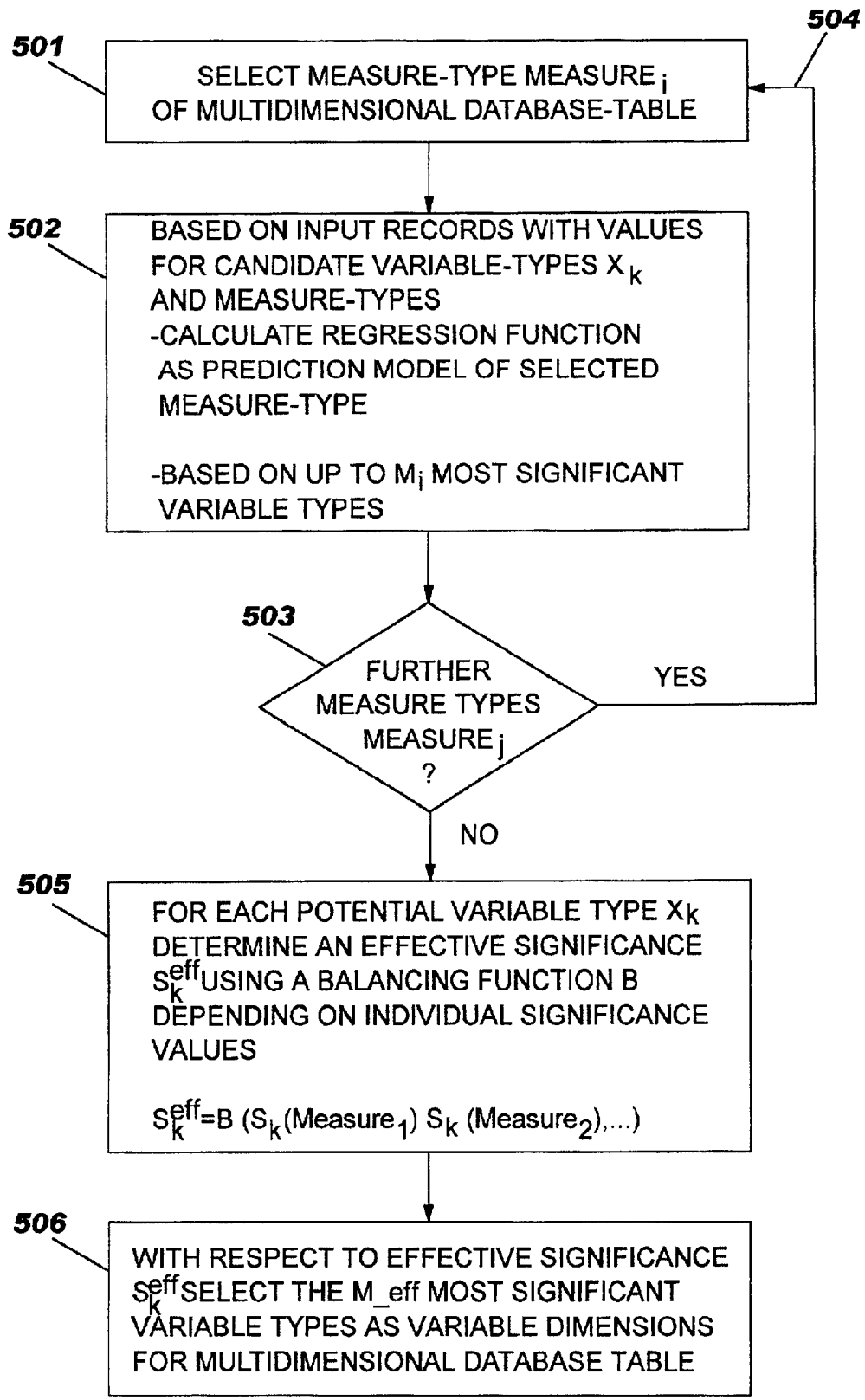
FIG. 5 is a flow chart depicting the determination process of the most significant variable types as variable dimensions of a multidimensional database table based on the calculation of regression functions.

Determination of the Most Significant Variable Types by Regression Functions in Case of a Single Measure Type FIG. 5 is a flow chart depicting the determination process of the most significant variable types as variable dimensions of a multidimensional database table based on the calculation of regression functions.

The proposed teaching starts by selecting a certain measure type Measure$_i$, in step 501. Based on the input records with values for the individual candidate variables $X_k$ and the measure type Measure$_i$, a regression function as prediction model of the values of the measure type Measure$_i$ is calculated in step 502. The regression function is calculated such that it depends on the sub-set of "up to" $M_i$ most significant of the variable types. In addition, for each of the up to $M_i$ variable types, a significance value $S_k(\text{Measure}_i)$ which indicates the influence of a certain variable type on the measure type is also calculated. This can be described as a regression problem in the form of $$\text{Measure}_i = A + \sum_{j=1}^{N} f_i(X_j) + \text{Error}$$

where $f_i(X_j)$ is a regression function, Measure$_i$ is the associated measure, $X_j$ is one of the available variable types, and A denotes the unknown coefficient.

It is important to point out the following aspects of the present invention:

1. The regression function calculated within step 502 does not depend on all of the N independent variable types but only on a subset of M independent variable types.
2. These M independent variable types represent the most significant ones in terms of correlation to, and influence on, the measure type. As outlined below in further detail, a significance measure will be used to guide an iterative calculation process that determines the regression function depending on the M most significant variable types.
3. Moreover the "up to M" most significant variable types are determined; that is, a set of most significant independent variable types smaller than M will be calculated, if the predictive quality of the calculated regression function is not improved by including further independent variable types.

This methodology has important advantages compared to other possible approaches.

In an approach A one could think of calculating a regression function as a prediction model depending on "all" available variable types, associating each variable type with a specific significance value. Then the M most significant variable types are selected as variable dimensions of the multidimensional database table (as OLAP cube dimensions). It is most important to note that such an approach suffers the deficiency that the significance values of the selected dimensions actually are influenced from the participation of the other (N-M not selected) variable types within the regression function. Therefore, such an approach does not make any statement on what the actual significances of the smaller subset of M variable types might have been, had the regression been based soley on the subset.

The following example (for purposes of explanation kept extremely simple) explains this situation. The example is based on input records comprising the following potential variable types: "SERVICE", "AGRI", "INDUS" and a certain measure type, which is not important to the current explanation. Based on one and the same data set, i.e. the input records, on one hand the teaching of the current invention is applied calculating a regression function depending on the values of up to one significant variable type only (the calculation made use of the further embodiments of the current invention as outlined below concerning the stepwise polynomial regression); on the other hand, the above approach A is applied, calculating a regression function depending on all three variable types.

Using the teaching of the current invention the following result was achieved:

| Dimension | Significance |
|---|---|
| AGRI | 0.99989741 |

Using above mentioned approach A the following result was achieved:

| Dimension | Significance |
|---|---|
| SERVICE | 0.89192000 |
| AGRI | 0.86274000 |
| INDUS | 0.30481820 |

As can be seen from the comparison of the two results, the cut-off optimization finds more significant dimensions and, most important, also changes the significance order of the variable types. Using the approach A, the variable type SERVICE is the most significant variable type, in contrast to the result according to the current teaching, where AGRI is the only (and the most) significant dimension. This example illustrates the advantages of the proposed technology for a single measure. For multiple measures (outlined in further details below) the potential error of a simple cut-off criteria will increase, because the significance errors for a single measure are aggregated to get the total significance.

In another approach B, one could think of calculating a regression function as a prediction model depending on "exactly" the subset of M most significant variable types. The drawback of this approach is that the given maximum number of variable types is not constrained to be the optimum set of dimensions, which might be much smaller. In general, approach B does not necessarily find a subset of the most significant variable types which is smaller than M, and which might represent together with the regression function a prediction model with the same or better prediction quality based on a smaller set of input information. More specifically this possibility of further reduction of the number of variable types is of major importance in determining OLAP dimensions.

All of the above deficiencies are avoided by the present invention.

If there is only one measure type available, then the most significant variable types are selected as variable dimensions of the multidimensional database table. In case further measures types are part of the multidimensional database table, the present teaching iterates in step 503 and step 504 by selecting one measure type after the other.

Figure 7:
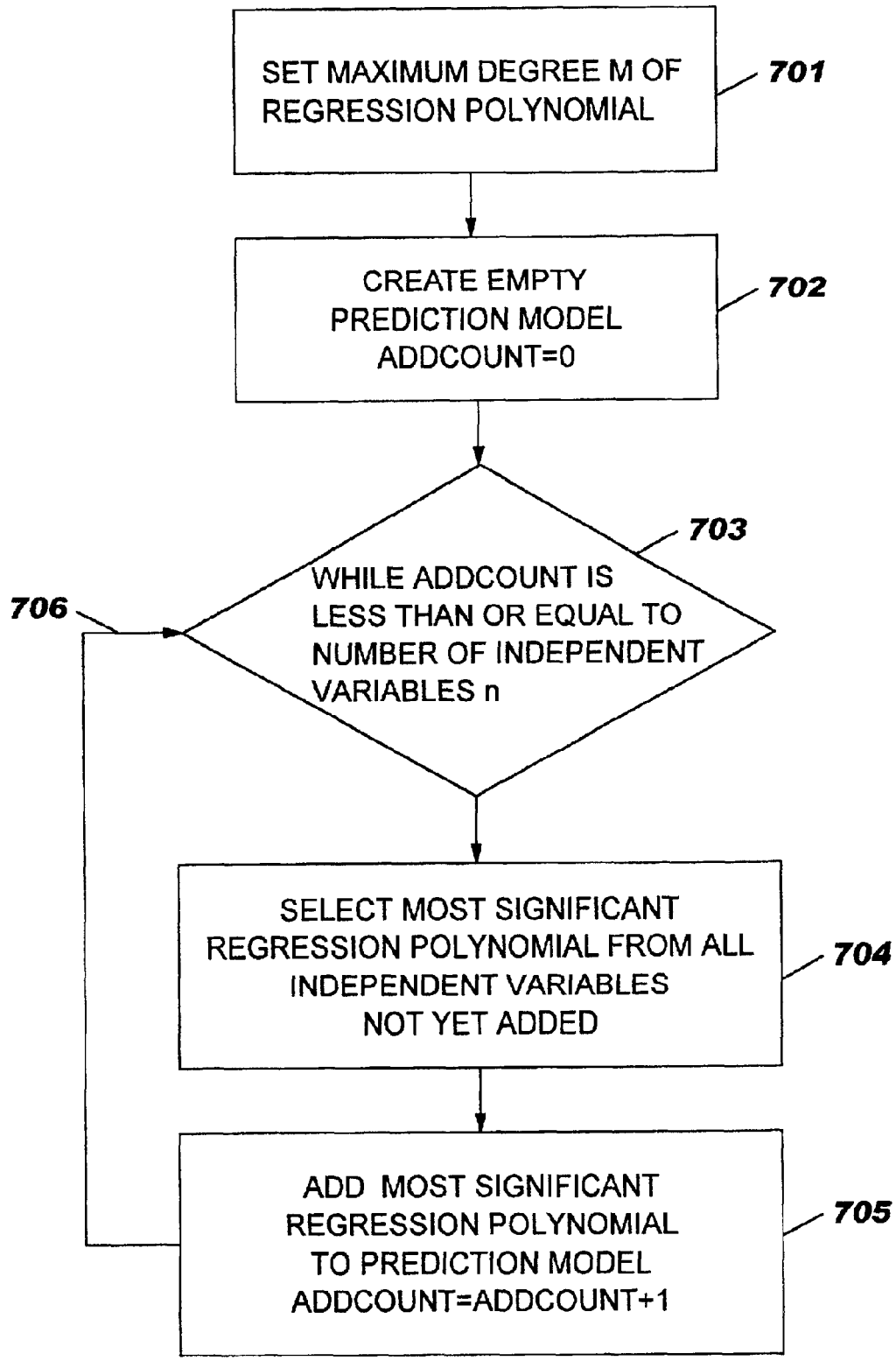
FIG. 7 is a flow chart depicting in more detail how a regression function may be calculated by an iteration process based on the calculation of specific regression functions, namely regression polynomials.

Calculating Regression Functions as Regression Polynomials by Stepwise Polynomial Regression For an explanation of another embodiment of the present invention relating to the specific technology of calculating a regression function, the focus of the discussion turns to FIG. 7. FIG. 7 is a flow chart depicting in more detail how, according to a preferred embodiment of the invention, a regression function is calculated by iteration. FIG. 7 concentrates on the calculation of specific regression functions, namely regression polynomials. An extension of this calculation to general regression functions will be described further below.

The present invention proposes a new methodology for determining a prediction model in the form of a regression polynomial called Stepwise Polynomial Regression. The following description is somewhat generalized from the foregoing context and is dedicated in general terms to the problem of calculating a regression polynomial for predicting the value of a variable dependent upon a set of independent variables.

Stepwise Polynomial Regression is an enhanced regression method improving the multiple polynomial regression approach. Multiple polynomial regression predicts the value of the dependent variable on the basis of n independent variables, each of which may be expressed by a polynomial of degree m common to all polynomials comprised in the prediction model. The input records mentioned above are used as a training set.

In contrast to multiple polynomial regression, where each independent variable is expressed by a polynomial of the same degree, Stepwise Polynomial Regression uses polynomials of potentially different degrees of the various independent variables. Moreover, in contrast with the multiple polynomial regression approach, the current invention includes a technique for individually determining the particular degree to be used for each independent variable. By selecting a polynomial of a certain degree for a given independent variable, the Stepwise Polynomial Regression function determines a fitting curve for this variable. The regression polynomials determined along these lines are combined to form the overall prediction model for the independent variable.

Assuming a maximum degree M for the potential regression polynomials, the Stepwise Polynomial Regression method may be expressed with the following formula:

$$y = A + \sum_{i=1}^{n} f(Xi) + \text{Error} \qquad \text{(eq. 1)}$$

where $$f(X_i) = \text{select one of} \begin{cases} B_{i1} * X_i^1 \\ B_{i1} * X_i^1 + B_{i2} * X_i^2 \\ \ldots \\ B_{i1} * X_i^1 + B_{i2} * X_i^2 + \ldots + B_{iM} * X_i^M \end{cases}$$

and where y is the dependent variable, $X_i$ are the independent variables, A and $B_i$ denote the unknown coefficients.

Stepwise Polynomial Regression determines the specific regression polynomial, i.e. the fitting curve (eq.1), in such a manner, that for each independent variable from all potential regression polynomials up to a maximum degree M, a specific regression polynomial is selected. A selection process is suggested which determines for each of the potential regression polynomials a significance value measuring its appropriateness to reflect the functional relationship with the dependent variable, i.e. showing the "closest" relationship with the dependent variable. The most significant potential regression polynomial according to this significance measure is selected and added to the prediction model.

FIG. 7 summarizes the proposed Stepwise Polynomial Regression methodology by a flow diagram.

Stepwise Polynomial Regression starts by setting the maximum polynomial degree (701) M. This step limits the set of regression polynomials from which the method selects the most significant one.

Within an initialization step (702) a current prediction model is initialized. In most cases the method starts with an empty prediction model, which means that none of the independent variables is represented by a regression polynomial in its functional relationship with the independent variable. Of course the method offers the flexibility to start with a certain initial prediction model. In this case the initial prediction model can either comprise fitting functions for independent variables which are or which are not candidate variables for further improvement by the current invention.

The steps (703) to (706) represent a looping sequence which can be repeated until a certain termination criterion is fulfilled. Within step (703) the method determines whether all independent candidate variables have been reflected already in the current version of the prediction model. This can be achieved by just counting the number of already reflected variables. Within step (704), for every independent variable not yet reflected in the prediction model a multitude of regression polynomials with different polynomial degrees are determined based on the training data. In one embodiment of the invention, for every independent variable not reflected, all regression polynomials according to eq. 1 of all degrees up to the maximum degree M are determined.

Next, for each of the candidate polynomials, their significance value is determined. The significance measures, based on the set of training data, the degree of improvement of the current prediction model in response to adding a regression polynomial. The significance is thus a measure of the appropriateness of a regression polynomial to reflect the functional relationship with the dependent variable, i.e. showing the "closest" relationship with the dependent variable. Within step (705) the most significant potential regression polynomial according to this significance measure and its corresponding independent variable is then selected and added to the current prediction model, thus reflecting that independent variable within the prediction model. The significance value is associated with the regression polynomial as well as with the independent variable of this most significant regression polynomial.

Within step (706) the method checks the fulfillment of a termination criterion. According to one implementation of the invention, the termination criterion is a test of whether all the independent variables have been included in the prediction model by contributing a regression polynomial. Upon termination, the final prediction model represents the prediction model as determined by the invention.

It is important to recognize that the suggested methodology removes the constraint that all regression polynomials of all independent variables must have a common polynomial degree m. Moreover, the invention finds, for the individual independent variables, the "most appropriate" regression polynomial (in terms of significance) modeling its functional dependency with the dependent variable. Thus, if the unknown functional relationship of a certain independent variable and the dependent variable is of polynomial degree K, the proposed method will discover that a regression polynomial of degree m=K will be "most appropriate" and will add it to the prediction model (assuming sufficient support by the training data), even if the methodology would allow for a degree up to M. The current invention will therefore avoid the deficiencies of the state of the art (as outlined above) of approximating a functional relationship with a regression polynomial which is too small or too large. The avoidance of this deficiency is of special importance in the area of OLAP technology for improved prediction of the dependent variable for values of the independent variable not in the immediate neighborhood of training data.

The Significance Measure

An advantageous implementation of a significance measure according to the current invention is based on the following features.

As a first observation, the significance measure of a regression polynomial for an independent variable is reduced to the simpler problem of a significance measure of the individual powers of a regression polynomial.

In a preferred embodiment of the invention, the significance of a polynomial is greater than or equal to the minimum significance of all it's linear predictors:

$$B_1 X, B_2 X^2, \ldots B_m X^m$$

Thus the significance of a regression polynomial is determined by the smallest significance of any of its powers.

A significance measure for linear predictors based upon this definition is required. For linear predictors, the invention may use the F-test to determine whether a predictor influences the dependent variables or not. The F-test is a well-known statistical test that checks whether two estimates of the variance of two independent samples are the same. In addition, the F-test checks whether the so-called NULL hypothesis is true or false. Applied to the current situation, assuming the inverse hypothesis, (i.e., "a predictor has no influence on the dependent variable"), this leads to the following NULL hypothesis for the F-test: "a coefficient $B_i$ in a linear regression model (with respect to the various $B_j$) is zero".

For a single linear predictor the test statistic is $$F = (B_i^2)/(S_{X_i Y}^2 * S_{X_i}^2) = t^2$$

with a degree of freedom of (n−2) where $S_{X,Y}$ is the empirical covariance between $X_i$ (an independent variable) and Y (the dependent variable) and $^S X$ is the empirical variance of $X_i$. In this special case the T-statistic $^t$ is equal to the root of the F-statistic. In other embodiments of the invention other statistical measures (like the T-Test) may be used as foundation for the significance measure.

From the perspective of a practical computation, the F-Test value of a certain regression polynomial is determined on the basis of tentatively adding the regression polynomial to the current prediction model and on the basis of the training set.

Based on this calculated F-test value, the probability of obtaining a larger F-test value (Probability>F) can be determined according to the known theory of the F-test. If this probability tends to zero there is statistical evidence for rejecting the NULL hypothesis. In other words, the more the F-test value approaches the value of 1, the larger is the support that the NULL hypothesis is true, thereby indicating small significance of the corresponding linear predictor (power of the regression polynomial); vice versa, the more the F-test value approaches the value of 0, the larger is the support that the NULL hypothesis is false, thereby indicating a large significance of the corresponding linear predictor. Thus the invention may use the (Probability>F) value based on the F-test theory as a significance measure for a linear predictor.

Stepwise Polynomial Regression Conditionally Adding Independent Variables

Stepwise Polynomial Regression allows for several optimization strategies depending on the particular objective. Improvements are targeted at reducing the number of independent variables which contribute to the prediction model. Stated in other terms, improvements of the method will reflect not all of the possible independent variables within the prediction model, and will limit the number of independent variables to those that contribute to a "larger degree" to the functional relationship with the independent variable.

A first improvement of Stepwise Polynomial Regression adds independent variables to the set of variables reflected in the prediction model conditionally. This first improvement exploits the so-called adjusted R square measure also called adjusted correlation coefficient. The adjusted R square measure is well known to statisticians.

This first improvement enhances a step (705) of FIG. 7. Instead of unconditionally adding the most significant regression polynomial to the prediction model, it is first determined whether inclusion would improve the adjusted correlation coefficient of the resulting prediction-model with respect to the training set. Only in the affirmative case the regression polynomial and the corresponding independent variable are added to the prediction model. Otherwise, the corresponding independent variable is excluded from the method without further participation in the iteration process.

More particularly, if step (704) indicates the most significant regression polynomial and its corresponding independent variable, and if this variable is the k-th variable to be added to the prediction model, the selection criteria for actually adding this independent variable to the prediction model is:

$$R'^2_k > R'^2_{k-1}$$

where the adjusted R square coefficient R' for linear predictors is:

$$R'^2_p = 1 - (q-1)/(q-p-1)*(1-R^2)$$

where $R^2$ is the squared correlation coefficient with respect to the fitted and observed values, q is the number of observations (i.e. the number of training records), and p is the number of independent predictors comprised by the regression polynomials within the current prediction model. In other words, the number of independent predictors p is equal to the number of unknown coefficients $B_i$.

The correlation coefficient R is calculated by dividing the covariance between the observed (i.e. according to the training data) and the predicted values by the variance of the observed values and the variance of the predicted values. Therefore $$R = S_{yy'}/(S_y S_{y'})$$

where $S_{yy'}$ is the empirical covariance of Y and Y', which is determined by $$S_{yy'} = \left(\sum_{i=0}^{q}(Y_i - Y_{Mean})(Y'_i - Y'_{Mean})\right)/(q-1)$$

and where $Y_i$ are the observed values of the dependent variables and $Y'_i$ are the predicted values.

As a result the Stepwise Polynomial Regression with adjusted R square optimization eliminates all independent variables which do not improve the adjusted correlation coefficient, i.e. which do not improve the prediction model. This results in a prediction model requiring a smaller number of independent variables, which provides a significant computational advantage. Only those independent variables that improve the prediction quality will become part of the prediction model.

Stepwise Polynomial Regression Conditionally Adding and Removing Independent Variables A second improvement of Stepwise Polynomial Regression likewise adds independent variables conditionally only to the set of variables reflected in the prediction model. Moreover, it also removes independent variables from the prediction model again in case of certain conditions. Thus the second improvement is targeted to determining a prediction model with as few independent variables as possible.

This second improvement enhances step (705) of FIG. 7. Instead of unconditionally adding the most significant regression polynomial to the prediction model, it is first determined whether the significance of the currently most significant regression polynomial is above a predefined threshold significance value. In the affirmative case, only the currently most significant polynomial is added to the prediction model. Additionally, this second improvement of the invention enhances the looping sequence reflected in FIG. 7 by a third step succeeding step (705). Within this new step it is determined whether the significance of a certain regression polynomial (or a multitude of regression polynomials) comprised within the current prediction model is reduced after the last regression polynomial has been added to the prediction model. If this is the case, said certain regression polynomial together with its corresponding independent data mining variable is removed from the current prediction model. Though this independent variable is no longer reflected in the prediction model, it may of course participate within the further iteration process; i.e. a removed variable may be added again in one of the next steps of the iteration. Another variation is to exclude an independent variable, which once has been removed from the prediction model, from the method without further participation in the iteration process.

These steps (adding, removing of variables) are repeated until all variables whose significance is higher than the specified threshold significance value are added to the model. This algorithm is called stepwise regression with full forward (adding variables) and backward (removing variables) capabilities. Expressing the termination criterion in other words, the looping sequence is terminated if the significance of the currently most significant regression polynomial is below the significance threshold.

With respect to the comparison of significance values, it must be stressed that the significance of variable is higher if its (Probability>F) value tends to zero. That means that a variable is added when its (Probability>F) value is lower than the given significance threshold. As the result, it is possible to find a prediction model that minimizes the number of required independent variables.

Determination of the Most Significant Variable Types by Regression Functions in Case of Multiple Measure Types Having discussed the details of calculating a regression function, the focus now returns to FIG. 5, and to describing further steps of the overall method of determining variable dimensions of a multidimensional database table.

In the following discussion it is assumed that a plurality of L different measure types is available. With respect to this situation the current invention proposes a technique that allows the determination of "up to" the M most significant dimensions for a set of L measures (M may be a predefined number). It must be stressed at this point that the prediction model for a certain measure type may comprise fewer than M variable types. This is due to the self optimizing capability of the current technology as outlined together with the description of FIG. 7 above or the further description given below together with FIG. 6. The current technology is capable of excluding certain variable types from being reflected within the prediction model if the inclusion of a variable type does not improve the prediction quality (measured by the adjusted correlation coefficient).

To solve this multidimensional problem, a two phase approach is proposed.

In the first phase, up to the M most significant variable dimensions are determined for each measure. This is done by using the single measure approach as described above. For each measure type, this identifies up to the M most significant variable types as candidates for the variable dimensions for which their corresponding significance value S is determined. The significance value is set to zero for a variable type which is not part of the prediction model for a certain measure type.

The above procedure is performed for each measure type. As result of the first phase, L significance values for each of the N available dimensions are determined.

For the second phase, the current invention proposes three alternative approaches for determining an overall significance value, called the effective significance $$S_k^{\mathit{eff}},$$

for each individual variable type $X_k$. The effective significance value is determined by a balancing function B that depends on all significance values of said variable types:

$$S_k^{\mathit{eff}} = B(S_k(\mathit{Measure}_1), S_k(\mathit{Measure}_2), \ldots, S_k(\mathit{Measure}_L))$$

The first approach focuses on the overall contribution of a single variable type to all measures types; therefore the effective significance of a single variable type is defined as the average significance of the individual significances with respect to the L measures $$S_k^{\mathit{eff}} = \left(\sum_{i=1}^{L} S_k(\mathit{Measure}_i)\right) / L$$

This approach tends to find the best overall dimensions for all measures.

The second approach focuses on a combination of the "best" variable types for each individual measure; this results in an effective significance of:

$$S_k^{\mathit{eff}} = \mathrm{Max}(S_k(\mathit{Measure}_1), S_k(\mathit{Measure}_2), \ldots, S_k(\mathit{Measure}_L))$$

This approach tends to find the "best" combination of dimensions to describe the individual aspects of the measures. To avoid weighting conflicts between the multiple measures, the invention provides "standardized" significance measures $S'_k(\mathit{Measure}_i)$ which are defined as $$S'_k(\mathit{Measure}_i) = S_k(\mathit{Measure}_i) / \mathrm{Max}(S_1(\mathit{Measure}_i), \ldots, S_N(\mathit{Measure}_i))$$

with a "standardized" effective significance:

$$S_k^{\prime \mathit{eff}} = \mathrm{Max}(S'_k(\mathit{Measure}_1), S'_k(\mathit{Measure}_2), \ldots, S'_k(\mathit{Measure}_L))$$

The third approach focuses on a kind of "worst case" by determining the effective significance value as the lowest value of all the significance-values:

$$S_k^{\mathit{eff}} = \mathrm{Min}(S_k(\mathit{Measure}_1), S_k(\mathit{Measure}_2), \ldots, S_k(\mathit{Measure}_L))$$

With the standardization introduced above, the standardized effective significance becomes:

$$S_k^{\prime \mathit{eff}} = \mathrm{Min}(S'_k(\mathit{Measure}_1), S'_k(\mathit{Measure}_2), \ldots, S'_k(\mathit{Measure}_L))$$

The activities of these two phases, (1) determining, for each potential variable type, a significance value for each measure type, and (2) using a balancing function that depends on the individual significance values, together allow the calculation of an effective significance value for each variable type. This process is depicted as step 505 within FIG. 5.

The final step, which appears in FIG. 5 as step 506, and which constitutes a third phase, selects the M most significant dimensions from the available N dimensions $$Z_1, Z_2, \ldots Z_M \text{ with } \{Z_k = X_j; k \in [1, 2, \ldots M]; j \in [1, 2, \ldots N]\}$$

The number of selected dimensions may be smaller than M if the rest of the possible variables types are associated with an effective significance value of 0.

The description above mentioned that the variable dimensions of a multidimensional database table are populated by a multitude of members. These members are further categorized in a multitude of hierarchical member levels. The variable types determined according to the current invention as variable dimensions of the multidimensional database table represent the members in the variable dimensions on the lowest hierarchical member level. The higher hierarchical member levels within each variable dimension are then created based on the lowest hierarchical member levels and the multitude of input records through an aggregation and consolidation process.

Figure 6:
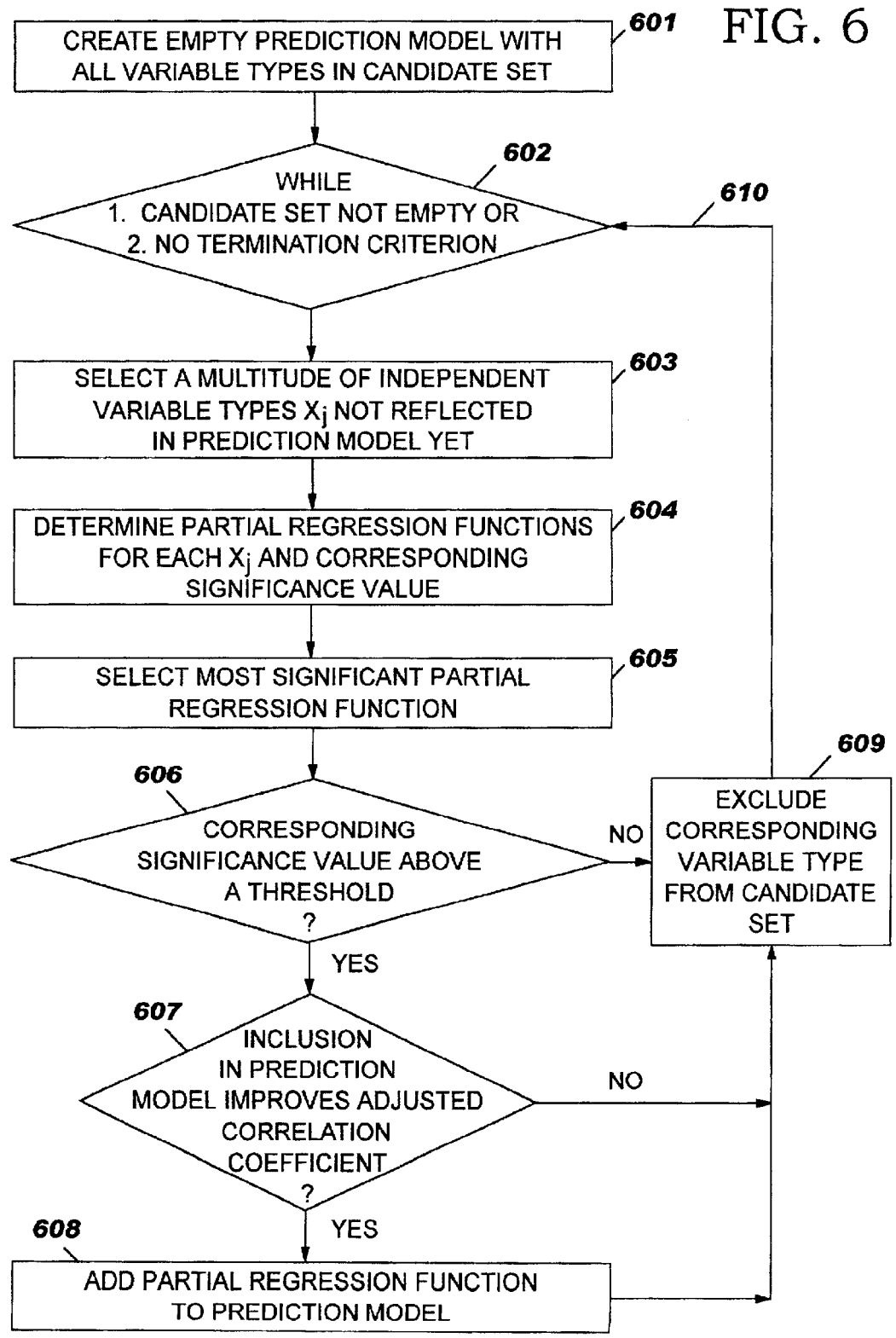
FIG. 6 is a flow chart depicting in more detail how a regression function may be calculated by an iteration process that calculates partial regression functions for the individual variable types.

Extension by Using General Regression Functions Instead of Regression Polynomials FIG. 6 is a flow chart depicting in more detail how, according to a preferred embodiment of the invention, a regression function is calculated by an iteration process that calculates partial regression functions for the individual variable types.

The method starts with an initialization-step 601 initializing a current prediction model. At the very beginning of the method the prediction model is empty. Furthermore a candidate set of variable types is established for inclusion within the regression function. At the beginning of the method this candidate set comprises all available variable types.

Next, the looping sequence 602 up to 609 will be described.

In step 602 a test is being made whether the candidate set still comprises a variable type not yet reflected within the regression function. In addition, step 602 determines whether any of the termination criteria (to be discussed below) are satisfied, which would end the process.

The looping sequence includes a step 603, which selects the variable types not yet reflected in the current prediction model. In step 604, a multitude of partial regression functions are determined where each partial regression function depends only on one of the variable types. In addition, a significance value S is determined for each of the partial regression functions.

In step 605, the most significant partial regression function and the corresponding not-yet-reflected variable type are selected. But instead of unconditionally adding the most significant partial regression function, step 607 first determines whether its inclusion improved the adjusted correlation coefficient R' of the resulting regression function. If the adjusted correlation coefficient R' is not improved, the corresponding variable type is removed from the candidate set in step 609, and the method iterates along path 610.

Thus the selection criteria for actually adding the k-th additional variable type to the regression function is:

$$R'^2_k > R'^2_{k-1} \text{ and } k <= M_i$$

where $M_i$ is a predefined upper limit of the number of variables to be to be reflected exploiting the i-th measure, and where the adjusted R square coefficient R' is:

$$R'^2_p = 1 - (q-1)/(q-p-1)*(1-R^2)$$

$R^2$ is the squared correlation coefficient with respect to the fitted and observed values of the $Measure_i$, q is the number of observations (i.e. the number of training records), and p is the number of dimensions comprised by the regression function within the current regression model. The selection criteria establish, in addition to the methodology as described in context with FIG. 7, a further constraint that may serve as a termination criterion: the number of variables making up the prediction model may not exceed an upper limit $M_i$. This feature of the invention limits the number of OLAP cube dimensions very effectively, and may be combined with all other features of the current invention. In practical uses of the current invention, this additional criterion has been proven to be very important.

The correlation coefficient R is calculated by dividing the covariance between the observed (i.e. according to the training data, i.e. multitude of input records) and the predicted values by the variance of the observed values and the variance of the predicted values. Therefore $$R = S_{Measure_i Measure'_i} / (S_{Measure_i} S_{Measure'_i})$$

where $S_{Measure_i Measure'_i}$ is the empirical covariance between $Measure_i$ and $Measure'_i$ which is determined by $$S_{Measure_i Measure'_i} = \left( \sum_{i=0}^{q} (Measure_i - Measure_{Mean})(Measure'_i - Measure'_{Mean}) \right) / (q-1)$$

and where $Measure_i$ are the observed values of the measure type and $Measure'_i$ are the predicted values of the measure type.

Furthermore $SMeasure_i$ and $SMeasure'_i$ are the well-known variances.

It is important to realize that proposed model optimization returns "up to the $M_i$" most significant variable types for the given measure. Thus the invention is able find any set of optimum (most significant) dimensions within 1 and $M_i$ Today's state of the art optimization criteria are able only to find an optimum set with a predefined maximum number $M_i$ of variable types. The improvement provided by the invention comes from the combination of 607, and 609.

Further benefit comes from the invention's constraint, which limits the number of variables making up the prediction model. This is shown by the following example, in which a regression function according to the current invention is calculated based on the same set of input records in a first case without the additional termination criterion $k <= M_i$ and in a second case with the additional termination criterion. In the example, the input records are the following 12 variable types: age_of_car, amount_of_claims, car_location, car_type, commute_distance, domicile, gender, material_status, no_of_claims, no_of_dependents, profession_category, salary Without the additional criterion, eight variable types are identified, with the following significance values:

| Dimension | Significance |
| --- | --- |
| salary | 0.99999958 |
| no_of_claims | 0.99994183 |
| commute_distance | 0.99348850 |
| gender | 0.95557000 |
| material_status | 0.95346000 |
| age_of_car | 0.88420000 |
| car_location | 0.83151000 |
| amount_of_claims | 0.63130000 |

The other variable types car_type, domicile, no_of_dependents and profession_category are dismissed automatically by the method.

Exploiting the additional criterion and limiting the number of variable types to seven, the following significance values result:

| Dimension | Significance |
| --- | --- |
| salary | 0.99999988 |
| no_of_claims | 0.99345700 |
| commute_distance | 0.99326300 |
| gender | 0.96173000 |
| material_status | 0.95478000 |
| age_of_car | 0.89051400 |
| car_location | 0.83201200 |

As can be seen from the comparison of the two results, the significance order of the variable types are the same, but the significance values differ. Assuming multiple measures, this difference in the precision of the significance values can decide whether a dimension is part of the proposed OLAP cube or not using regression functions as described earlier.

Optional step 606, which may be executed before or after step 607, checks whether the determined significance value is above a predefined threshold value. Only if this is the case, will the method proceed to step 608; otherwise the already discussed step 609 will be executed and the method iterates along the path 610.

Finally, if all these tests have been successful, the calculated partial regression function is added to the prediction model. The method then iterates via step 609 and path 610 calculating further partial regression functions and corresponding variable types.

In another embodiment of the determination process of a regression function, step 608 may be succeeded by a further step of determining whether the significance of a certain partial regression-function, which is already part of the current prediction model, is reduced after execution of step 608. In the affirmative case, that partial regression function and its corresponding variable type would be removed again from the current prediction model.

Several termination criteria may be imposed on the iteration procedure. For instance the looping sequence may be terminated if all variable types are reflected in the current prediction model. Also, the looping sequence may be terminated if the significance of the most significant partial regression function of the current iteration step is below a second significance threshold.

I claim:

1. A computerized method for automatically determining at least one variable dimension for a multi-dimensional database table, said multi-dimensional database table also comprising at least one pre-defined measure dimension for storing values of at least one measure type, the method comprising the steps of:

determining a set of input records, each of said input records comprising a value of at least a first measure type and associated values of a plurality of variable types, said variable types representing candidates for a variable dimension; and calculating a regression function for use as a prediction model of said value of said measure type, said regression function depending on values of a subset of up to M most significant of said plurality of variable types; and determining said most significant variable types as variable dimensions of a multi-dimensional database table.

2. The method according to claim 1, further including the step of:

determining members of said variable dimension;

wherein said values of a subset of up to M most significant of said plurality variable types are selected as members of said variable dimension on a lowest hierarchical member level; and wherein hierarchical aggregations of said members are aggregated as further members of said variable dimension on higher hierarchical member levels.

3. The method according to claim 1, further including the steps of:

calculating for each of said up to M most significant of said plurality variable types a significance value; and, associating each variable type not contributing to said regression function a significance value of zero.

4. The method according to claim 3, wherein in a first phase said method is repeated for a set of L measure types, including the steps of:
calculating L regression functions; and
calculating significance values for each variable type of each of said L regression functions; and wherein in a second phase for each variable type determining an effective significance value by a balancing function depending on all significance values of said each variable type.

5. The method according to claim 4, wherein in a third phase, the up to M most significant of said plurality variable types according to said effective significance value are selected as variable dimensions of said multi-dimensional database table, wherein M is a predefined number.

6. The method according to claim 3, wherein calculating a regression function for use as a prediction model comprises the following steps:

initializing a current prediction model; and executing a looping sequence.

7. The method of claim 6, wherein the step of executing includes the steps of:

determining f or every variable type not yet reflected in said current prediction model a plurality of partial regression functions, each partial regression function depending only on one of said variable types;

determining for each of said partial regression functions a significance value; and selecting a most significant partial regression function and a corresponding variable type not yet reflected, adding said most significant partial regression function to said current prediction model; and, associating said corresponding variable type with said significance value.

8. The method according to claim 7, wherein said most significant partial regression function is added only if its addition improves an adjusted correlation coefficient of the prediction model and if its addition does not cause M to be exceeded.

9. The method according to claim 8, further including the steps of:

determining whether significance of a partial regression function included in said current prediction model is reduced after execution of said step of adding said most significant partial regression funtion; and when significance is reduced, removing said partial regression function and corresponding variable type from said current prediction model.

10. The method according to claim 9, wherein said looping sequence is terminated if all variable types are reflected in said current prediction model.

11. The method according to claim 9, wherein said looping sequence is terminated if the significance of said most significant partial regression function is below a second significance threshold.

12. The method according to claim 7, wherein said partial regression functions are regression polynomials.

13. The method according to claim 12, further comprising the steps of:

calculating significance of all powers of a regression polynomial; and using a minimum significance of said powers as a significance measure of said regression polynomial.

14. The method according to claim 13, wherein the step of calculating further includes the step of:

calculating said significance of said powers based on F test values for coefficients of said powers.

* * * * *